(12) United States Patent
Weaver et al.

(10) Patent No.: US 8,880,383 B1
(45) Date of Patent: Nov. 4, 2014

(54) DETERMINING CONDUCTIVITY OF AGED FRACTURE PROPPANTS FOR SIMULATING FLOW IN A FRACTURED RESERVOIR

(71) Applicant: Halliburton Energy Services, Inc., Houston, TX (US)

(72) Inventors: Jimmie D. Weaver, Duncan, OK (US); Neelam Deepak Raysoni, Pune (IN); Wirdansyah Lubis, Magnolia, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/041,339

(22) Filed: Sep. 30, 2013

(51) Int. Cl.
*G06F 17/00* (2006.01)
*G06F 17/50* (2006.01)
*G01N 15/08* (2006.01)

(52) U.S. Cl.
CPC .................................. *G06F 17/5009* (2013.01)
USPC ...................... 703/10; 703/9; 73/790; 374/51

(58) Field of Classification Search
CPC ...... E21B 43/267; G06G 7/57; G06F 2217/76
See application file for complete search history.

(56) References Cited

U.S. PATENT DOCUMENTS

2003/0050758 A1* 3/2003 Soliman et al. .................... 702/6
2009/0306898 A1* 12/2009 Anschutz et al. ............... 702/11

OTHER PUBLICATIONS

Lee et al., An Evaluation of the Effects of Fracture Diagenesis on Fracture Treatments: Modeled Response, ARMA 09-104, 2009.*
Osholake, Factors Affecting Hydraulically Fractured Well Performance in the Marcellus Shale Gas Reservoirs, Master's Thesis, Dec. 2010.*
Raysoni et al., Improved Understanding of Proppant-Formation Interactions for Sustaining Fracture Conductivity, SPE Saudi Arabia Section Technical Symposium and Exhibition, Apr. 8-11, 2012.*
Vincent, Restimulation of Unconventional Reservoirs: When are Refracs Beneficial?, CSUG/SPE 136757, 2010.*
Weaver et al., A Study of Proppant-Formation Reactions, SPE 121465, 2009.*
Wen et al., The Effect of Proppant Embedment Upon the Long-Term Conductivity of Fractures, J. Petroleum Sci. & Eng., 55 (2007) 221-227.*
Palisch et al., "Determining Realistic Fracture Conductivity and Understanding its Impact on Well Performance—Theory and Field Examples," SPE 106301-MS, Copyright 2007, 2 pages.

(Continued)

*Primary Examiner* — Kamini S Shah
*Assistant Examiner* — Michael P Healey
(74) *Attorney, Agent, or Firm* — Craig W. Roddy; Fish & Richardson P.C.

(57) ABSTRACT

In one example, formation fluid flow through a fractured reservoir is simulated using conductivity of aged proppants. A first conductivity profile is received for a proppant. The first conductivity profile describes an ability of the proppant to permit formation fluid flow through a fracture network under reservoir conditions in a fractured reservoir that includes the proppant in the fracture network. The proppant is aged for a duration under the reservoir conditions of the fractured reservoir over the duration. After the duration, a second conductivity profile for the aged proppant is determined. An adjusted conductivity profile for the proppant is determined based on the first conductivity profile and the second conductivity profile. The adjusted conductivity profile is provided as an input conductivity profile for the proppant. The reservoir simulator simulates formation fluid flow through the fractured reservoir using the input conductivity profile.

20 Claims, 4 Drawing Sheets

(56) References Cited

OTHER PUBLICATIONS

Yasuhara et al., "Evolution of Permeability in a Natural Fracture: Significant Role of Pressure Solution," J. Geophys. Res., vol. 109, B03204, doi: 10.1029/2003JB002663, Mar. 13, 2004, 11 pages.
Cipolla et al., "The Effect of Proppant Distribution and Un-Propped Fracture Conductivity on Well Performance in Unconventional Gas Reservoirs," SPE 119368-MS, Copyright 2009, 1 page.
Lehman et al., "Proppant Conductivity—What Counts and Why," SPE 52219-MS, Copyright 1999, 1 page.
Cobb et al., "Evaluation of Long-Term Proppant Stability", SPE 14133, Mar. 17-20, 1986, 10 pages.
Marin Cikes, "Long-Term Hydraulic-Fracture Conductivities Under Extreme Conditions," SPE 66549, Nov. 2000, pp. 255-261.
Kaufman et al., "Introducing New API/ISO Procedures for Proppant Testing," SPE 110697-MS, Copyright 2007, 2 pages.
"Measurement of Properties of Proppants Used in Hydraulic Fracturing and Gravel-Packing Operations," ANSI/API Recommended Practice 19C First Edition, ISO 13503-2:2006, May 2008, 9 pages.

* cited by examiner

US 8,880,383 B1

DETERMINING CONDUCTIVITY OF AGED FRACTURE PROPPANTS FOR SIMULATING FLOW IN A FRACTURED RESERVOIR

TECHNICAL FIELD

This disclosure relates to proppants used in fractured reservoirs.

BACKGROUND

Fracture networks in fractured reservoirs (e.g., subterranean formations) provide pathways for formation fluid flow through the reservoirs. An ease with which the formation fluid can flow through the fracture network represents conductivity for a fracture network in a fractured reservoir. Computer-implemented techniques to simulate the formation fluid flow through the fracture networks can be performed, e.g., by modeling individual elements of the fracture network. Such simulation can provide the predicted conductivity for a fracture network in a fractured reservoir. Examples of computer software applications that can be implemented to simulate the formation fluid flow include Fracpro®, Gohfer® and Quik-Look®, to name a few. Such computer software applications can help design optimized fracture treatments and to predict conductivity of the proposed fracture stimulation. If, however, the observed (i.e., real) conductivity for the actual fracture network does not match the predicted (i.e., simulated) conductivity for the simulated fracture network, then the simulation may be inefficient.

BRIEF DESCRIPTION OF THE DRAWINGS

Like reference numbers and designations in the various drawings indicate like elements.

DETAILED DESCRIPTION

Figure 1:
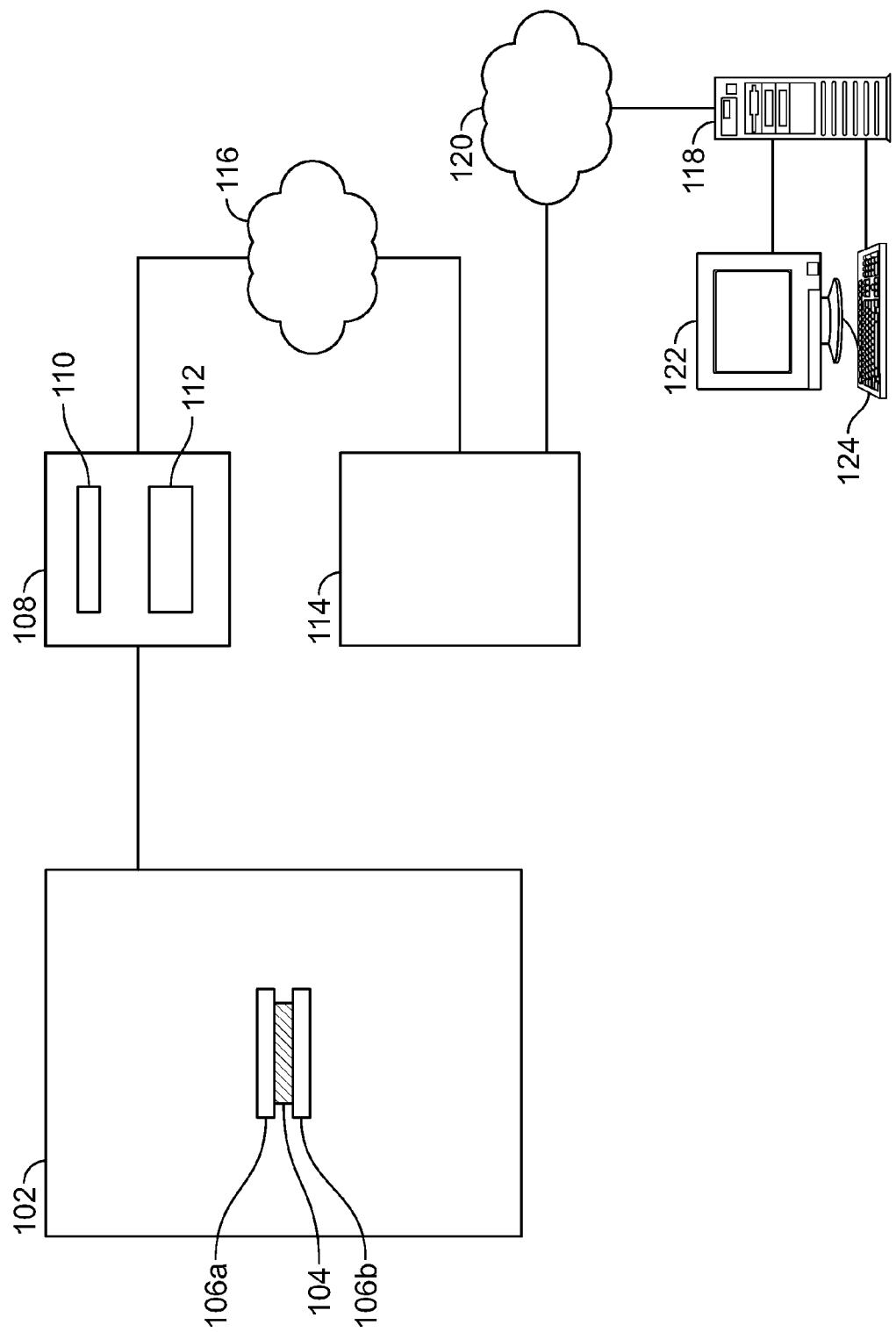
FIG. 1 illustrates an example environment for determining conductivity of aged proppants for simulating flow in a fractured reservoir.

This disclosure relates to determining conductivity of aged proppants for stimulating flow in a fractured reservoir. Sometimes, observed pressure responses in fractured reservoirs do not match the pressure responses predicted based on simulation of production fluid flow through the fractured reservoirs. One analysis of 150 wells found that the observed conductivities were approximately 5% less than predicted conductivities. Reasons for the discrepancies include, for example, non-Darcy effects, multi-phase flow, gel damage and fines migration. Also, geochemistry studies of fractures in rock have demonstrated that under stress and temperature, fractures tend to heal with time due to a mechanism called pressure solution. In this mechanism, where proppant grains in contact with each other are under high stress, material is dissolved into solution and moves to the region of relatively lower stresses, e.g., pore spaces. This results in alteration of fracture aperture and hence reduced conductivity.

Proppants, which are used to maintain fracture width in the fracture network, require sufficient strength to do so throughout the life of the fractured reservoir. The stresses on the proppant near the end of the life of the fractured reservoir may be higher than an earlier time. Like natural fractures, proppants also undergo pressure solution rearrangement. Moreover, the proppants are affected by the geological conditions in the fractured reservoir. For example, the mechanical strength and structure of the proppants are affected by the geochemical reactions to which the proppants are exposed in the fractured reservoir for periods of time that can span a few to several months.

Computational models for stimulating flow in the fractured reservoir may consider the stresses on the proppant in the fractured network of the fractured reservoir. However, laboratory-measured proppant conductivity that is provided as an input to such models are sometimes time-independent. That is, the laboratory-measured proppant conductivity experiments do not consider proppant deterioration beyond 48 hours at a stress level. Because the proppants remain in the fracture network for significantly longer durations (e.g., 3 months, 6 months, 12 months, 18 months, 24 months, or other longer durations spanning several months or years), providing stresses based on a deterioration time of only 48 hours may not be an input to the computational models that adequately represents the realistic deterioration of the proppants.

This disclosure describes techniques to provide a time-dependent proppant conductivity as an input to a computational model that stimulates flow in the fractured reservoir. The time-dependent proppant conductivity can represent the effect of long-term hydrothermal exposure on proppants (e.g., on proppant conductivity) used in a fractured reservoir. The techniques described here can be implemented to determine the time-dependent proppant conductivity and to allow the quantification of proppant strength loss due to the geothermal chemical reactions that occur in the fractured reservoir regardless of the stresses in the reservoir. The determined effects can be factored into the predicted baseline conductivity for the proppant for a specified set of conditions, e.g., geological conditions that the proppant will experience in the fracture network of the fractured reservoir. The predicted baseline conductivity for the proppant, adjusted according to the determined effects of time on the proppant conductivity, can be provided to a reservoir simulator (e.g., a computer software application) that simulates formation fluid flow through the fractured reservoir. The simulator can then simulate the formation fluid flow using realistic conductivity data (including a time-dependent conductivity profile), and consequently better predict fracture performance. An operator of the simulator can use the realistic conductivity data in making best choices for fracture design and proppant type. Because the realistic conductivity numbers are used, this data can also be used for production planning, e.g., plan drawdown pressure. Moreover, a large number of proppants, proppant sizes, reservoir conditions and cycle of the production activity may need to be evaluated to obtain a comprehensive database of proppant conductivities. To make such a study more economically feasible, the techniques described here can be implemented to decrease the large number of tests that need to be performed.

In some implementations to determine time-dependent conductivity profiles for proppants, described in further detail below, proppant samples are sealed into cells (e.g., steel chambers) with appropriate reservoir fluid and placed into thermally stable ovens which are maintained at appropriate temperatures. Each proppant sample is run in multiples so that samples can be pulled at time intervals such as 3, 6, 12 months or other time intervals. A small sample of the aged proppant is taken and a Weibull crush analysis is performed to determine if the proppant is stable or is deteriorating. At the time frame at which the samples have stopped changing, a larger sample is taken and API conductivity test is performed to obtain the realistic reference conductivity. The rate of strength loss can be estimated by examination of the Weibull analysis and determination of whether or not API conductivity needs to be determined because some samples may be stable and the reference conductivity may not change with time. In this manner, a number of tests can be decreased. The proppant conductivities determined by performing these tests can be provided to the computational models to simulate the flow of production fluid through a fractured reservoir. Alternatively, or in addition, a proppant deterioration rate can be determined using the Weibull analysis and provided to the computational models.

FIG. 1 illustrates an example environment for determining conductivity of aged proppants for simulating flow in a fractured reservoir. In an evaluation environment 102, a proppants 104 (i.e., a proppant to be used in a fracture network of a fractured reservoir) can be evaluated to determine, among other things, conductivity profiles of the proppants 104. The evaluation environment 102 can also be used to age the proppants as described below. For example, the evaluation environment 102 can be a laboratory that includes equipment suitable to perform operations on and to evaluate the proppants 104.

Conductivity profiles determined for the proppants 104 (e.g., before and after aging) in the evaluation environment 102 can be provided to a computer system 108, e.g., a desktop computer, a laptop computer, a tablet computer, a personal digital assistant, a smartphone, or other computer system. The computer system 108 can include a computer-readable medium 110 storing instructions executable by one or more processors 112 to perform operations. The computer system 108 can store the conductivity profiles for the proppants 104 and perform operations based on the conductivity profiles, e.g., adjusting a conductivity profile of the proppants 104 based on aging the proppants 104.

The computer system 108 can be connected to a reservoir simulator 114 to simulate flow through the simulated fractured reservoir. For example, the reservoir simulator 114 can include a computer system that can execute a computer software application to simulate the fracture network in the fractured reservoir resulting in the simulated fractured reservoir. The reservoir simulator 114 can further simulate the flow of the proppants 104 through the simulated fractured reservoir. In some implementations, the computer system 108 and the reservoir simulator 114 can be connected using one or more wired or wireless networks 116 (e.g., a local area network, a wide area network, the Internet). The computer system 108 can provide an adjusted conductivity profile of the proppants 104 to the reservoir simulator 114. The adjusted conductivity profile can be an input parameter using which the reservoir simulator 114 can simulate formation fluid flow through the simulated fractured reservoir. In some implementations, the computer system 108 and the reservoir simulator 114 can be implemented as a single entity, while, in others, each can be a separate entity.

In some implementations, an operator of the reservoir simulator 114 can access the reservoir simulator 114 using a client computer system 118 that is connected to the reservoir simulator 114 through one or more wired or wireless networks 120, e.g., the Internet. The client computer system 118 can include a display device 122 on which an output of the reservoir simulator 114 can be displayed. The operator can provide instructions to the reservoir simulator 114 using input devices 124 (e.g., a mouse, a stylus, a keyboard, a touchscreen, voice command, and other input devices) that are connected to the client computer system 118.

Figure 2:
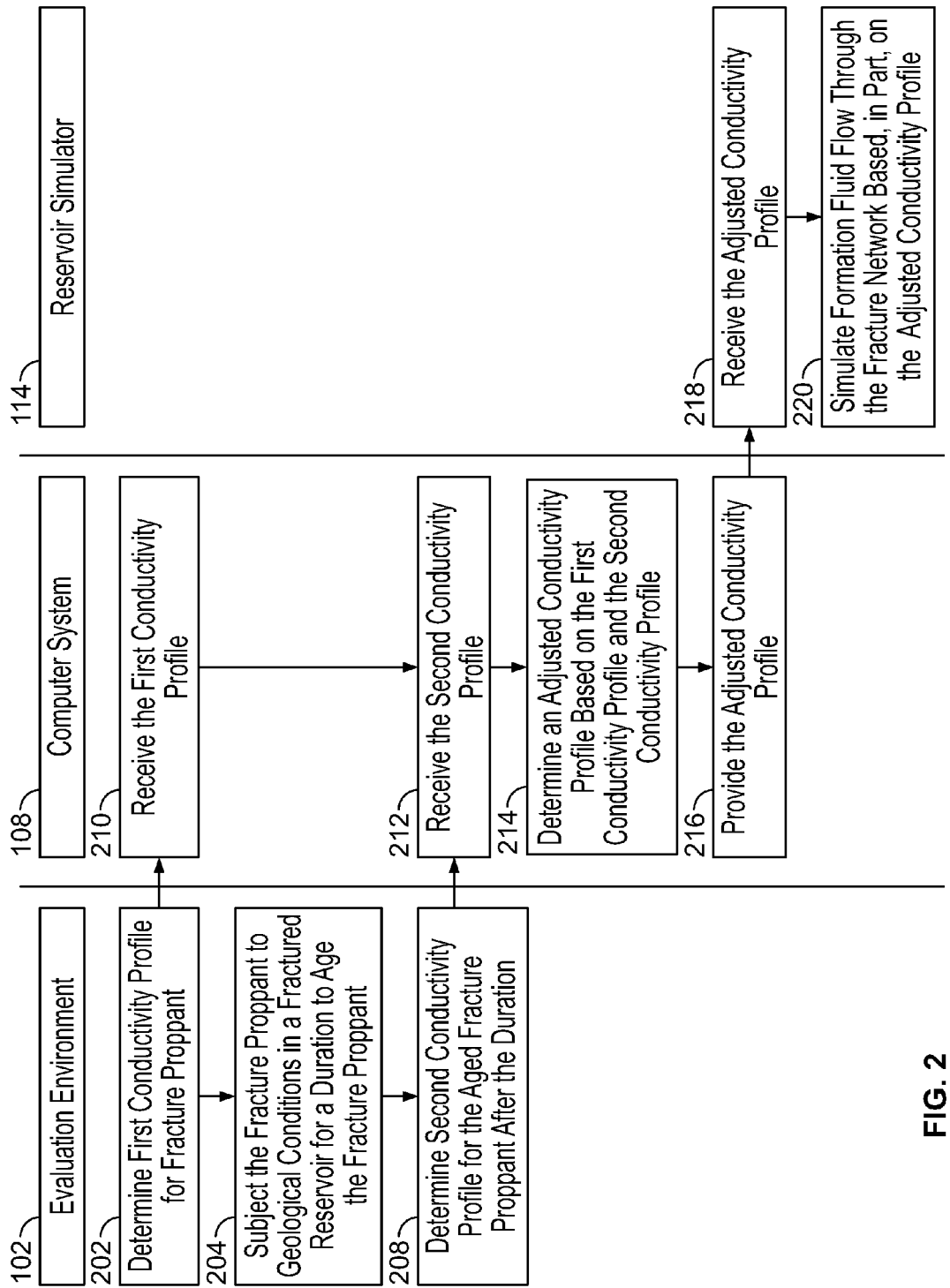
FIG. 2 illustrates example operations implemented in the example environment of FIG. 1.

FIG. 2 illustrates example operations implemented in the example environment of FIG. 1. At 202, a first conductivity profile for a proppant can be determined. The proppant will be flowed into a fracture network of a fractured reservoir to maintain the natural fractures or induced fractures (or both) for the duration of formation fluid flow through the fractured reservoir. The first conductivity profile can represent an ability of the proppant to permit formation fluid flow through the fracture network under reservoir conditions in the fractured reservoir that includes the proppant in the fracture network. Thus, when the first conductivity profile is determined for the proppant, the proppant has not yet been exposed to the reservoir conditions in the fractured reservoir.

In some implementations, the first conductivity profile can be determined in the evaluation environment 102 by performing one or more experiments. To determine the first conductivity profile, an operator can sandwich a specified quantity of a sample of the proppant 104 between two core wafers (e.g., a first core wafer 106a, a second core wafer 106b). The operator can apply specified stresses to the sandwich and monitor a conductivity of the sandwich over a specified duration (e.g., 24-48 hours). The operator can repeat these processes for different closure stresses starting at, e.g., 2000 psi, and increasing in steps of 2000 psi, e.g., to 4000 psi, 6000 psi, 8000 psi. The operator can also perform these steps at different temperatures to determine temperature performances of the proppant as well. In some implementations, the operator can implement practices recommended by the American Petroleum Institute (API) to determine conductivity for proppants used in hydraulic fractures, e.g., Recommended Practice (RP) 61, described, e.g., in American Petroleum Institute, Washington D.C. 20005.

By implementing these processes in the evaluation environment 102, the operator can determine the first conductivity profile as multiple conductivities for the proppant at respective multiple first stresses or at respective multiple first temperatures (or both). The multiple first stresses and the multiple first temperatures at which the proppant is evaluated can correspond to stresses and temperatures included in the reservoir conditions to which the proppant will be exposed when flowed into the fracture network in the fractured reservoir. The reservoir conditions can include, e.g., geological conditions in the fractured reservoir, conditions of the formation fluids flowing through the fractured reservoir, operating conditions (e.g., production rates), drawdown pressure and other conditions. In some implementations, the operator can store the first conductivity profile, including the multiple conductivities at the multiple first stresses and the multiple first temperatures, as computer-readable data to provide to the computer system 108, as described below.

At 204, the proppant can be subjected to reservoir conditions in the fractured reservoir for a duration. In this manner, the proppant can be aged for the duration. In some implementations, the aging can be performed in the evaluation environment 102. The duration for which the proppant is aged is greater than the duration (e.g., 24 to 48 hours) for which the proppant is evaluated to determine the first conductivity profile. The duration corresponds to the time for which the proppant will remain in the fracture network of the fractured reservoir, e.g., 3 months, 6 months, 12 months, 18 months, 24 months or other shorter or longer durations.

During aging, the operator can expose the proppant sample to the reservoir conditions of the fractured reservoir over the duration. The reservoir conditions can include at least one of a temperature or a pressure of the fractured reservoir over the duration. The reservoir conditions can alternatively (or in addition) include one or more formation fluids that will flow through the fractured reservoir over the duration. In some implementations, the operator can expose the proppant to the reservoir conditions of the fracture network in the fractured reservoir by placing the proppant sample between two core wafers, each obtained from the fracture network, placing the proppant sample and the two core wafers in a sealed cell, and exposing the cell to the reservoir conditions. For example, the evaluation environment 102 can include equipment in which the pseudo-reservoir conditions can be recreated. The operator can prepare multiple such sealed cells and place one or more of the sealed cells in the appropriate equipment to age the proppant sample. In one example, the operator can fill the sealed cell with formation water (or frac water) to recreate the reservoir conditions of the proppant in the fractured reservoir.

At 208, a second conductivity profile can be determined for the aged proppant after the duration. The second conductivity profile can describe an ability of the aged proppant to permit formation fluid through the fracture network under the reservoir conditions in the fractured reservoir that includes the aged proppant. In some implementations, the operator can determine the second conductivity profile by performing operations similar those that the operator performed to determine the first conductivity profile. The second conductivity profile can, consequently, include multiple conductivities for the aged proppant at respective multiple second stresses or at respective multiple second temperatures (or both).

Such a second conductivity profile can be determined for multiple durations. For example, the second conductivity profile for a proppant aged for three months can include multiple conductivities at respective multiple stresses or temperatures. Additional second conductivity profiles can similarly be determined for each of six months, twelve months, eighteen months, 24 months, and other shorter (e.g., 30 days) or longer durations. Multiple stresses and temperatures are included in the geological conditions in the fracture network to which the proppant would have been exposed over the corresponding duration. In some implementations, the operator can store the each second conductivity profile, including the corresponding multiple conductivities at the multiple first stresses and the multiple first temperatures, as computer-readable data to provide to the computer system 108.

Figure 3:
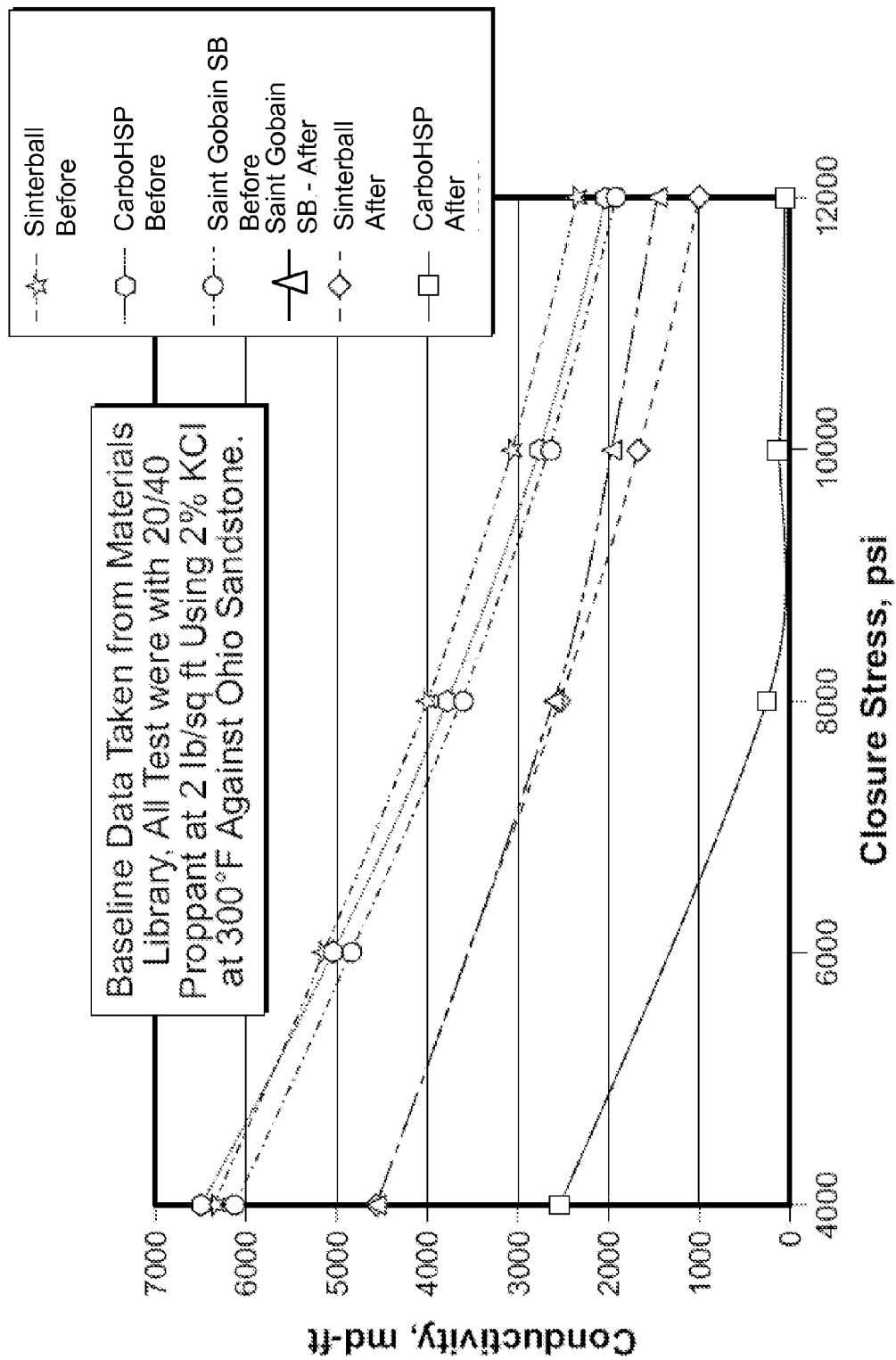
FIG. 3 is a plot showing changes in conductivity profiles of proppants over time.

For a proppant, the second conductivity profile can be different from the first conductivity profile. FIG. 3 is a plot showing changes in conductivity profiles of proppants over time. For example, for the proppant Sinterball™, the conductivities included in the first conductivity profile and those included in the second conductivity profile are different. Similarly, for the proppant CarboHSP™, a decrease in the conductivities in the second conductivity profile relative to the first conductivity profile is greater than a corresponding decrease for the proppant Saint Gobain SB™. The decrease in the conductivities in the first and second conductivity profiles reflects an effect that the geochemical conditions in the fractured reservoir have on the proppant for the duration that the proppant is in the fractured reservoir.

At 210 and at 212, the computer system 108 can receive the first conductivity profile and the second conductivity profile, respectively. For example, the operator can provide the computer-readable data that represents the first conductivity profile and the second conductivity profile as inputs to the computer system 108, which can store the computer-readable data on the computer-readable medium 110.

At 214, the computer system 108 can determine an adjusted conductivity profile for the proppant based on the first conductivity profile and the second conductivity profile. For example, the computer system 108 can determine the adjusted conductivity profile as a difference between the multiple conductivities included in the second conductivity profile and the multiple conductivities included in the first conductivity profile.

At 216, the computer system 108 can provide the adjusted conductivity profile, which the reservoir simulator 114 can receive at 218. Using the adjusted conductivity profile as an input parameter, the reservoir simulator 114 can simulate formation fluid flow through the fracture network based, in part, on the adjusted conductivity profile. By implementing the techniques described here, the output of the reservoir simulator 114 can account for changes to the proppant due to exposure to the geochemical conditions in the fractured reservoir for the duration that the proppant is in the fracture network in the fractured reservoir.

Figure 4:
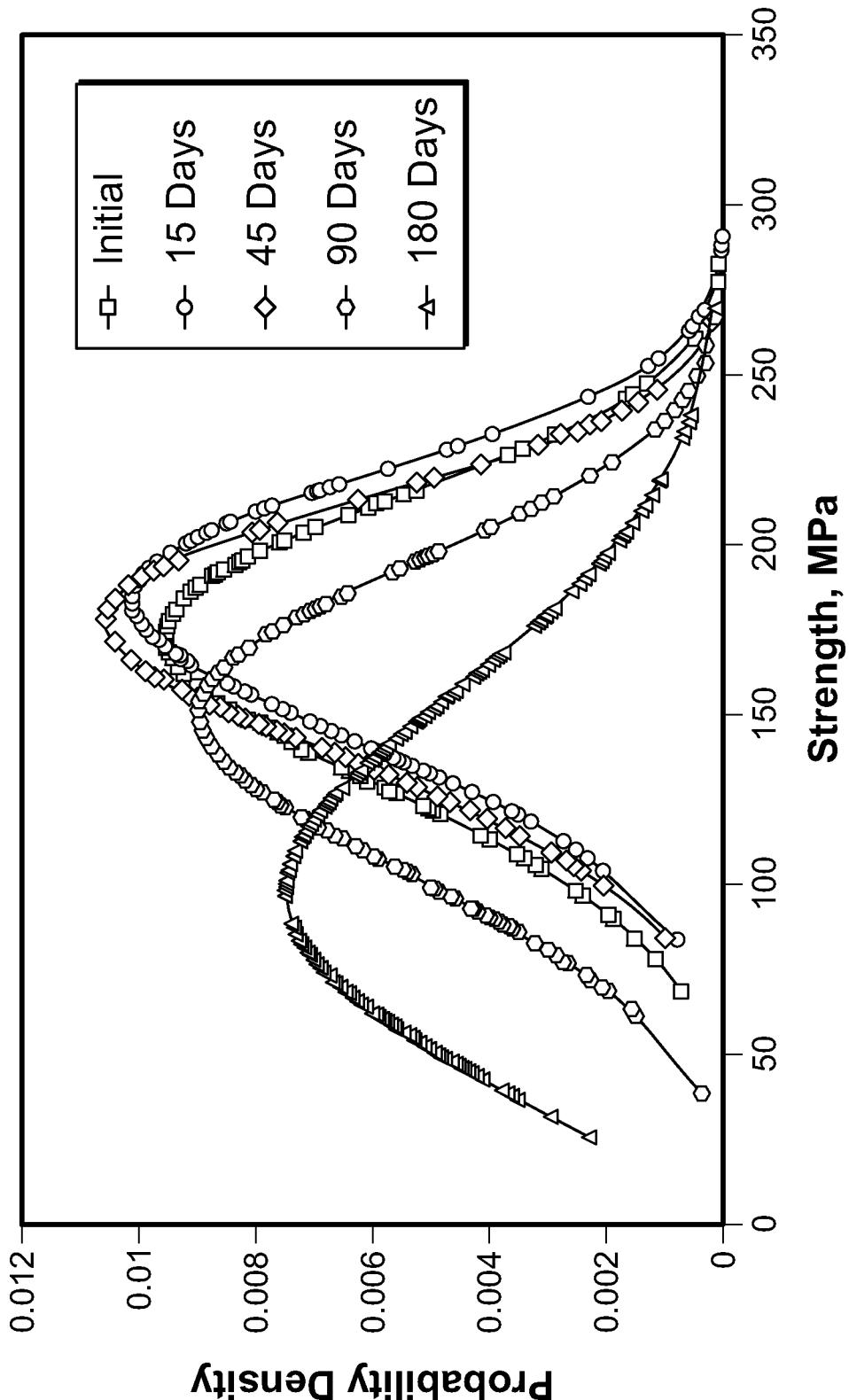
FIG. 4 is a plot showing probability density distributions of proppant subjected to psuedogeochemical environment of temperature as seen in reservoir.

The number of long-term experiments that an operator may perform to develop the data set to determine the adjusted conductivity profile can be large. In addition to the time necessary to perform these experiments, the cost and ease of performing the experiments may be significant. In some implementations, the changes to the proppant strength over time can be determined by implementing a rapid Weibull crush analysis for each aged proppant sample. To do so, a small sample of the aged proppant (e.g., an individual proppant grain) is subjected to force, and a force at which the sample fails is noted. The force at which the sample fails is then converted to individual strength values, e.g., in Mpa. The distribution curve is obtained as shown in FIG. 4 using statistical analysis. This is done by using methods as prescribed in *ASTM C1239-07: Standard Practice for Reporting Uniaxial Strength Data and Estimating Weibull Distribution Parameters for Advanced Ceramics.* 2007. Conshohocken, Pa.: ASTM International. doi: 10.1520/C1239-07. The distribution curve can be provided as input to the computer system 108 as a probability distribution of the strength of the proppant over time. From the probability distribution, the computer system 108 can identify a time at which a decrease in a strength of the proppant is statistically significant. The second conductivity profile can be determined at the identified time, e.g., using a larger sample of the proppant aged to the identified time. If, at the identified time, the decrease in strength is not statistically significant, the proppant can continue to be aged until a subsequent time at which the decrease in proppant strength is statistically significant. In this manner, the number of long-term experiments to measure the second conductivity profiles can be decreased.

FIG. 4 shows multiple probability density distributions across strengths (in MPa) for a proppant. In the plot shown in FIG. 4, probability densities were determined for $20/40$ mesh Sinterball™ after exposure to deionized water at 300° F., at an initial time, and then 15 days, 45 days, 90 days and 180 days after the initial time. The proppant pack included about 15% $8/16$ mesh Ohio Sandstone material, which represents a geochemical condition to which the proppant can be exposed in the fractured reservoir. The plot shows that, for an aging duration of up to 45 days, strength of the proppant increased possibly due to heat treatment effects. The strength decreased after aging the proppant for 180 days. Thus, the second conductivity profile need not be measured after 45 days of aging as the proppant strength increases rather than decreases. Instead, the second conductivity profile can be measured after 180 days of aging because the decrease in strength after this duration is statistically significant.

A number of implementations have been described. Nevertheless, it will be understood that various modifications may be made without departing from the spirit and scope of the disclosure.

What is claimed is:

1. A method for simulating flow in a fractured reservoir, the method comprising:
receiving a first conductivity profile for a proppant, the first conductivity profile describing an ability of the proppant to permit formation fluid flow through a fracture network under reservoir conditions in a fractured reservoir that includes the proppant in the fracture network;
aging, for a duration, the proppant under the reservoir conditions of the fractured reservoir over the duration;
determining, after the duration, a second conductivity profile for the aged proppant, the second conductivity profile representing an effect of aging the proppant for the duration under the reservoir conditions and describing an ability of the aged proppant to permit formation fluid flow through the fracture network under the reservoir conditions in the fractured reservoir that includes the aged proppant, wherein determining the second conductivity profile for the aged proppant comprises:
determining a probability distribution of a strength of the proppant over a period of time; and
identifying, from the probability distribution, a point in the period of time at which a decrease in the strength of the proppant is statistically significant;
determining an adjusted conductivity profile for the proppant based on the first conductivity profile and the second conductivity profile; and
providing the adjusted conductivity profile as an input conductivity profile for the proppant, the input conductivity profile used to simulate flow through the fractured reservoir.

2. The method of claim 1, wherein the first conductivity profile for the proppant comprises a plurality of conductivities for the proppant at a respective plurality of first stresses or at a respective plurality of first temperatures or both, wherein the plurality of first stresses and the plurality of first temperatures are included in the reservoir conditions in the fracture network that includes the proppant.

3. The method of claim 2, wherein receiving the first conductivity profile for the proppant comprises determining the plurality of conductivities at the respective plurality of first stresses or at the respective plurality of first temperatures or both.

4. The method of claim 1, wherein the second conductivity profile for the aged proppant comprises a plurality of conductivities for the aged proppant at a respective plurality of second stresses or at a respective plurality of second temperatures or both, wherein the plurality of second stresses and the plurality of second temperatures are included in the reservoir conditions in the fracture network that includes the aged proppant.

5. The method of claim 1, wherein aging, for the duration, the proppant under the reservoir conditions of the fractured reservoir over the duration comprises exposing a proppant sample to the reservoir conditions of the fractured reservoir over the duration.

6. The method of claim 5, wherein the reservoir conditions include at least one of a temperature or a pressure of the fractured reservoir over the duration or one or more formation fluids that will flow through the fractured reservoir over the duration.

7. The method of claim 5, wherein exposing the proppant sample to the reservoir conditions comprises:
placing the proppant sample between two core wafers, each obtained from the fracture network;
placing the proppant sample and the two core wafers in a sealed cell; and
exposing the cell to the reservoir conditions.

8. The method of claim 1, wherein the duration is at least one of three months, six months, or twelve months.

9. The method of claim 1, wherein the probability distribution is determined by a Weibull analysis of the strength of the proppant over the period of time.

10. A method for simulating flow in a fractured reservoir, the method comprising:
determining a first conductivity profile for a proppant, the first conductivity profile describing an ability of the proppant to permit formation fluid flow through a fracture network under geological conditions in a fractured reservoir that includes the proppant in the fracture network;
determining a duration by:
determining strengths of the proppant at a first point in time and at a second point in time after the first point in time, respectively;
determining that a difference between the strengths is statistically significant; and
in response to determining that the difference is statistically significant, determining that the duration has expired;
determining, after the duration, a second conductivity profile for the proppant, the second conductivity profile representing an effect of aging the proppant for the duration and describing an ability of the proppant to permit formation fluid flow through the fracture network under the geological conditions in the fractured reservoir that includes the proppant for the duration, wherein determining the second conductivity profile for the proppant comprises aging, for the duration, the proppant under reservoir conditions in the fractured reservoir over the duration;
determining an adjusted conductivity profile for the proppant based on the first conductivity profile and the second conductivity profile; and
simulating formation fluid flow through the fracture network using the adjusted conductivity profile as an input conductivity profile for the proppant.

11. The method of claim 10, further comprising:
determining that the difference is not statistically significant; and
in response to determining that the difference is not statistically significant, determining that the duration has not expired.

12. The method of claim 10, wherein aging, for the duration, the proppant under the reservoir conditions in the fractured reservoir comprises exposing a proppant sample to the reservoir conditions over the duration.

13. The method of claim 12, wherein determining the second conductivity profile for the proppant comprises:
determining a probability distribution of a strength of the proppant over a period of time, wherein the probability distribution is determined by a Weibull analysis of the strength of the proppant over the period of time; and
identifying, from the probability distribution, a point in the period of time at which a decrease in the strength of the proppant is statistically significant.

14. The method of claim 10, wherein determining the adjusted conductivity profile for the proppant based on the first conductivity profile and the second conductivity profile comprises determining the adjusted conductivity profile based on a difference between the first conductivity profile and the second conductivity profile.

15. A system comprising:
one or more processors; and
a computer-readable medium storing instructions executable by the one or more processors to perform operations comprising:
receiving a first conductivity profile for a proppant, the first conductivity profile describing an ability of the proppant to permit formation fluid flow through a fracture network under reservoir conditions in a fractured reservoir that includes the proppant in the fracture network;
aging, for a duration, the proppant under the reservoir conditions of the fractured reservoir over the duration;
determining, after the duration, a second conductivity profile for the aged proppant, the second conductivity profile representing an effect of aging the proppant for the duration under the reservoir conditions and describing an ability of the aged proppant to permit formation fluid flow through the fracture network under the reservoir conditions in the fractured reservoir that includes the aged proppant, wherein determining the second conductivity profile for the aged proppant comprises:
determining a probability distribution of a strength of the proppant over a period of time; and
identifying, from the probability distribution, a point in the period of time at which a decrease in the strength of the proppant is statistically significant;
determining an adjusted conductivity profile for the proppant based on the first conductivity profile and the second conductivity profile; and
providing the adjusted conductivity profile as an input conductivity profile for the proppant, the input conductivity profile used to simulate flow through the fractured reservoir.

16. The system of claim 15, wherein the probability distribution is determined by a Weibull analysis of the strength of the proppant over the period of time.

17. The system of claim 15, wherein the first conductivity profile for the proppant comprises a plurality of conductivities for the proppant at a respective plurality of first stresses or at a respective plurality of first temperatures or both, wherein the plurality of first stresses and the plurality of first temperatures are included in the reservoir conditions in the fracture network that includes the proppant.

18. The system of claim 17, wherein receiving the first conductivity profile for the proppant comprises determining the plurality of conductivities at the respective plurality of first stresses or at the respective plurality of first temperatures or both.

19. The system of claim 15, wherein the second conductivity profile for the aged proppant comprises a plurality of conductivities for the aged proppant at a respective plurality of second stresses or at a respective plurality of second temperatures or both, wherein the plurality of second stresses and the plurality of second temperatures are included in the reservoir conditions in the fracture network that includes the aged proppant.

20. The system of claim 15, wherein aging, for the duration, the proppant under the reservoir conditions of the fractured reservoir over the duration comprises exposing a proppant sample to the reservoir conditions of the fractured reservoir over the duration.

* * * * *

UNITED STATES PATENT AND TRADEMARK OFFICE
CERTIFICATE OF CORRECTION

PATENT NO.        : 8,880,383 B1
APPLICATION NO.   : 14/041339
DATED             : November 4, 2014
INVENTOR(S)       : Jimmie D. Weaver, Neelam Deepak Raysoni and Wirdansyah Lubis Page 1 of 1

It is certified that error appears in the above-identified patent and that said Letters Patent is hereby corrected as shown below:

In the Claims

Claim 6, Column 7, Line 63, replace "or" with -- of --

Signed and Sealed this
Third Day of March, 2015

Michelle K. Lee
*Deputy Director of the United States Patent and Trademark Office*